(12) United States Patent
Srinivasan (10) Patent No.: US 8,509,228 B2
(45) Date of Patent: Aug. 13, 2013

(54) METHOD AND APPARATUS FOR PRIORITIZING SOURCE MAC ADDRESS MISS PROCESSING

(75) Inventor: Shriram Srinivasan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 707 days.

(21) Appl. No.: 12/132,581

(22) Filed: Jun. 3, 2008

(65) Prior Publication Data

US 2009/0296728 A1    Dec. 3, 2009

(51) Int. Cl.
*H04L 12/66*    (2006.01)

(52) U.S. Cl.
USPC ............................ 370/389; 370/402; 370/396

(58) Field of Classification Search
USPC ........................... 370/389, 392, 396; 709/203
See application file for complete search history.

(56) References Cited

U.S. PATENT DOCUMENTS

| 6,580,715 | B1 * | 6/2003 | Bare | 370/396 |
| 2004/0218539 | A1 | 11/2004 | Anqud et al. | |
| 2007/0118595 | A1 * | 5/2007 | Jain et al. | 709/203 |

FOREIGN PATENT DOCUMENTS

WO    WO2008/030151    * 9/2010

OTHER PUBLICATIONS

"IEEE Standard for Local and Metropolitan Area Networks, Media Access Control (MAC) Bridges," IEEE Computer Society, IEEE Std 802.1D-2004, Sponsored by the LAN/MAN Standards Committee, New York, NY, Jun. 9, 2004, 281 pages.

* cited by examiner

*Primary Examiner* — Dang Ton
*Assistant Examiner* — Pamit Kaur
(74) *Attorney, Agent, or Firm* — Blakely Sokoloff Taylor & Zafman, LLP (57) ABSTRACT

A method and apparatus for prioritizing source Media Access Control (MAC) address miss processing is described. In one embodiment of the invention, a network bridge receives multiple frames (each including a source MAC address) at multiple ports of multiple line cards. If a source MAC address of a received frame is associated with a different port than which it was received on, the network bridge places a source MAC miss message in a high priority MAC move miss queue. If a source MAC address of a received frame is not associated with any of the ports of the network bridge, the network bridge places a source MAC miss message in a low priority unknown MAC miss queue. The network bridge processes those source MAC miss messages in the high priority queue with a higher priority than processing those source MAC miss messages in the low priority queue.

22 Claims, 5 Drawing Sheets

CHILD BRIDGE FORWARDING
STRUCTURE 232

| MAC ADDR 502 | PORT 504 | MARK 506 |
|---|---|---|
| M1 | 112 | Y |
| M_A | 110 | N |
| ... | ... | ... |
| M_M | 110 | N |
| M_N | 113 | N |
| ... | ... | ... |
| M_Z | 113 | N |

FIG. 5

METHOD AND APPARATUS FOR PRIORITIZING SOURCE MAC ADDRESS MISS PROCESSING

BACKGROUND

1. Field

Embodiments of the invention relate to the field of network processing; and more specifically, to prioritizing processing of source Media Access Control (MAC) address misses.

2. Background

A layer 2 network bridge (data link layer in the Open Systems Interconnection Basic Reference Model (OSI MODEL), ISO/IEC 7498-1, Nov. 15, 1994) is a device used to connect multiple computing devices from one network to other network(s). The bridge scans incoming data frames for the source MAC address and the destination MAC address. A MAC address is typically a globally unique address of a physical network interface card inside a computing device and usually does not change for the life of the computing device.

A network bridge dynamically builds a forwarding structure based upon the source MAC addresses of the frames it receives and the ports associated with those MAC addresses. A typical architecture of a network bridge includes at least one control card and multiple line cards. The control card includes a parent bridge forwarding structure which stores a master version of the associations between MAC addresses and ports. The control card distributes the content of the parent bridge forwarding structure to each of the line cards (e.g., to child bridge forwarding structures). Thus, each line card typically has an equivalent child bridge forwarding structure that reflects the information in the parent bridge forwarding structure.

Upon receiving a frame, a processor on the line card performs a lookup in its child bridge forwarding structure to determine if the source MAC address is associated with the port the frame was received on. A source MAC address miss is determined if the source MAC address is not associated with the port the frame was received on. For example, a source MAC address miss exists if the MAC address is associated with a different port than the frame was received on, or if the MAC address is not associated with any ports. If the MAC address is associated with a different port than the frame was received on, the source MAC address has moved. This is referred to as a source MAC address move (e.g., the source MAC address has moved between ports). Source MAC address moves may occur for expected (legitimate) reasons (e.g., the computing device associated with that source MAC address has physically moved locations) and/or unexpected (illegitimate) reasons (e.g., a bridge forwarding loop). A bridge forwarding loop may cause many source MAC address misses in a short amount of time.

If the line card determines there is a source MAC address miss, the line card sends a source MAC address miss message to a processor on the control card so that the processor may update the parent bridge forwarding structure (e.g., to create an association between that MAC address and that port, or to modify the current association to reflect the source MAC address move). If there are many source MAC address misses (e.g., in the case of a bridge forwarding loop), the source MAC address miss messages are queued to the processor. The control card updates its parent bridge forwarding structure and distributes the update to each of the child bridge forwarding structures on the line cards. Depending on the load on the CPU, this process may take several seconds.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, a switch, a bridge, etc.) is a piece of networking equipment, including hardware and software that communicatively interconnects other equipment on the network (e.g., other network elements, computer end stations, etc.). Some network elements support the configuration of multiple contexts. As used herein, each context includes one or more instances of a virtual network element (e.g., a virtual bridge, a virtual router, etc.). Each context typically shares one or more computing resources (e.g., memory, processing cycles, etc.) with other contexts configured on the network element, yet is independently administrable. For example, in the case of multiple virtual bridges, each of the virtual bridges shares computing resources, but is separate from those other virtual routers regarding its management domain, authentication, authorization, and accounting (AAA) name space, and bridge forwarding data structure(s).

A method and apparatus for prioritizing source MAC address miss processing is described. In one embodiment of the invention, a network bridge receives multiple frames (each including a source MAC address) at multiple ports of multiple line cards. Each source MAC address miss is classified based on the cause of the source MAC address miss. The network bridge prioritizes processing of those source MAC address misses based on their classification.

Figure 1:
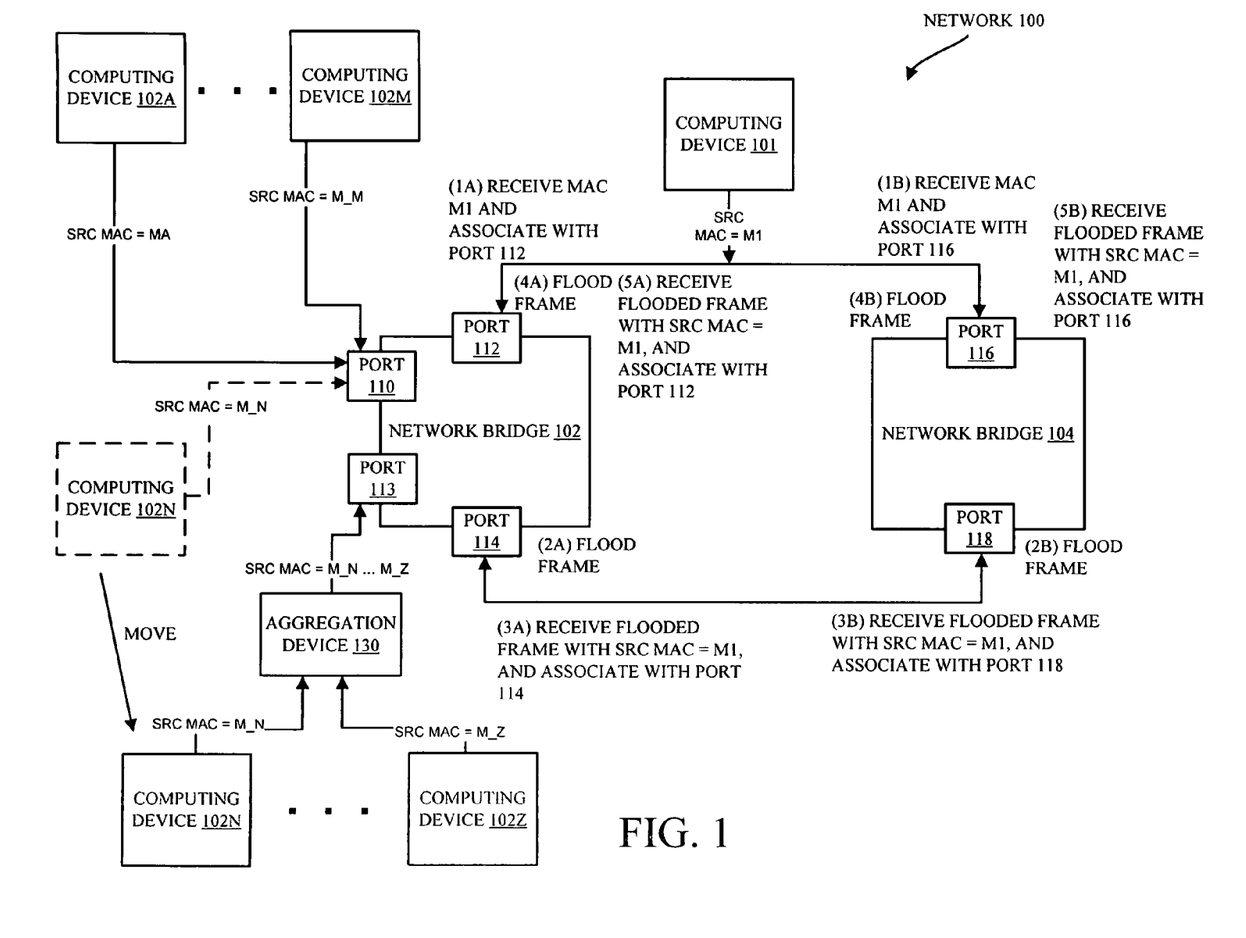
FIG. 1 is a data flow diagram illustrating an exemplary network with learning network bridges and a bridge forwarding loop according to one embodiment of the invention.

FIG. 1 is a data flow diagram illustrating an exemplary network 100 with learning network bridges according to one embodiment of the invention. FIG. 1 also illustrates an exemplary bridge forwarding loop where source MAC address moves are occurring at a fast rate according to one embodiment of the invention. FIG. 1 includes the computing devices 101 and 102A-102Z (e.g., a desktop, laptop, server, workstation, etc.) communicatively coupled with a network bridge 102. The computing device 101 is also communicatively coupled with and the network bridge 104. The computing devices 102N-102Z is coupled with the aggregation device 130. According to one embodiment of the invention, the computing device 101 transmits frames with a source MAC address of M1, the computing devices 102A-102Z transmit frames with a source MAC address of M_A-M_Z respectively. The network bridge 102 includes the ports 110, 112, 113, and 114. The network bridge 104 includes the ports 116 and 118.

Initially, the network bridges 102 and 104 have no knowledge of the computing devices 101 and 102A-Z (e.g., the MAC addresses $M_1$ and M_A-M_Z are not included in a bridge forwarding structure of the network bridges). However, as frames are received at ports of the network bridges, the network bridges "learn" MAC addresses (e.g., associate the source MAC address of a frame with the port the frame was received on). For example, as previously described, upon receiving a frame at a port on a line card, a processor on the line card performs a lookup in its child bridge forwarding structure to determine if the source MAC address is associated with the port the frame was received on. A source MAC address miss is determined if the source MAC address is not associated with the port the frame was received on. For example, a source MAC address miss exists if the MAC address is associated with a different port than the frame was received on, or if the MAC address is not associated with any ports. For example, in FIG. 1, after receiving a frame from one of the computing devices 102A-M on the port 110 of the network bridge 102, that one of the computing devices 102A-M will be associated with the port 110. Similarly, after receiving a frame from one of the computing devices 102N-Z on the port 113 of the network bridge 102, that one of the computing devices 102N-Z will be associated with the port 113. In addition, the computing device 101 is associated, at different times, with the ports 112 and 114 of the network bridge 102, and with the ports 116 and 118, due to a bridge forwarding loop.

The data flow in FIG. 1 illustrates an exemplary bridge forwarding loop. At operations 1A and 1B, the network bridges 102 and 104 respectively receive a frame with a source MAC address of M1 and associate that MAC address with the port it received the frame on (port 112 and port 116 respectively). Thus, the bridge forwarding structure on the network bridges 102 and 104 did not include an association for the MAC address M1 with the ports 112 and 116 respectively. In addition, the destination MAC address of the frame (not shown in FIG. 1 for simplicity purposes) is unknown. Thus, the network bridges 102 and 104 each flood the frame on each port except the port from which it came from. Thus, at operations 2A and 2B, the network bridges 102 and 104 flood the frame out ports 114 and 118 respectively. It should be understood that the network bridge 102 also floods the frame out ports 110 and 113, however this is not illustrated for simplicity purposes.

At operations 3A and 3B, the network bridges 102 and 104 each receive the frame flooded by the other network bridge (the frame still has a source MAC address of M1). Thus, the network bridges 102 and 104 each believe that the source MAC address has moved (e.g., moved from ports 112 and 116 to ports 114 and 118 respectively). Thus, the network bridges 102 and 104 associate the source MAC address M1 with the ports 114 and 118. In addition, the destination of the MAC address is still unknown, thus, the network bridges flood the frame on each port except the port the frame was received on. Thus, at operations 4A and 4B, the network bridges 102 and 104 flood the frame out ports 112 and 116 respectively. It should be understood that the network bridge 102 also floods the frame out ports 110 and 113, however this is not illustrated for simplicity purposes.

At operations 5A and 5B, the network bridges 102 and 104 each receive the frame flooded by the other network bridge and the frame still has a source MAC address of M1. Thus, the network bridges 102 and 104 each believe that the source MAC address has moved (e.g., moved from ports 114 and 118 to ports 112 and 116 respectively). Thus, the network bridges 102 and 104 associate the source MAC address M1 with the ports 112 and 116.

Thus, it should be understood that a bridge forwarding loop exists in FIG. 1. The bridge forwarding loop, which may continue indefinitely unless resolved, causes unnecessary use of network resources (e.g., bandwidth, processing cycles, memory, etc.) and traffic as a result may become blackholed (e.g., silently dropped or discarded). Commonly, a loop detection algorithm, such as a spanning tree protocol (STP)

algorithm, is employed on a bridge network similar to FIG. 1. STP, when performed correctly, blocks one or more ports which may prevent the loop. However, in certain circumstances, the loop detection algorithm fails to detect a loop. For example, STP must be configured at each of the ports of the network in the bridge to prevent loops (e.g., ports 112-118 in FIG. 1). On some occasions, a network administrator may incorrectly configure STP which may lead to STP not being configured on each of the ports. As another example, other types of bugs (hardware or software), and/or other configuration errors, cause the loop detection algorithm to fail (i.e., to not detect the loop).

As an additional safeguard to the loop detection algorithm, typical network bridges also perform a source MAC address move detection application. As described previously, a source MAC address may move for expected and legitimate reasons (e.g., the computing device 102N has moved from the port 110 to the port 113 (i.e., the source MAC address M_N has been received on the port 113 after being associated with the port 110)) and for unexpected (illegitimate) reasons (e.g., during a bridge forwarding loop). Typically, the source MAC address move detection algorithms blocks ports in a similar fashion as a STP algorithm to resolve a bridge forwarding loop. Since not all source MAC address moves are for unexpected reasons, the source MAC address move detection algorithm is not performed until a certain threshold of source MAC address moves are met over a given time interval (e.g., five source address MAC moves in a period of time of 5 seconds). Typically a CPU in the control card of the network bridge counts the source address MAC moves and determines whether to execute the MAC address move detection application.

In a typical network bridge, processing of source MAC address miss messages is not prioritized between processing source MAC address miss messages caused by a source MAC move (e.g., the source MAC address is associated with a different port than the MAC address was received on) and processing source MAC address miss messages caused by an unknown MAC address (e.g., the source MAC address is not associated with any port). If there are many source MAC address misses, they are put into a queue to be processed by the CPU in the control card in a serial fashion (e.g., one by one). In other words, regardless of the cause of the source MAC address miss, each source MAC address miss is put into the same queue to be processed by the CPU in a serial fashion (e.g., source MAC address misses are placed into the queue and the CPU processes the queue in a FIFO (First-In-First-Out) manner). Thus, in a typical network bridge, source MAC address misses caused by a source MAC address move are processed with the same priority as source MAC address misses caused by an unknown MAC address. If a bridge forwarding loop is occurring, and thus many source MAC address misses are generated due to source MAC address moving at a fast rate (e.g., at line rate), those messages may be placed in the same queue as source MAC address misses due to unknown MAC addresses. Thus, execution of applications that depend on a source MAC address move count (e.g., a MAC address move detection application) may be delayed because source MAC address miss messages caused by unknown MAC addresses are processed with the same priority as source MAC address miss messages caused by source MAC moves. Thus, not prioritizing processing of source MAC address miss messages may cause the network bridge to take longer to take corrective action during a bridge forwarding loop. It should be understood that the longer it takes for the network bridge to take corrective action during a bridge forwarding loop, the longer traffic may be sent to an incorrect bridge, the more network resources are unnecessarily consumed (e.g., processing cycles, memory, bandwidth, etc.), and the possibility that traffic becomes blackholed become greater.

Figure 2:
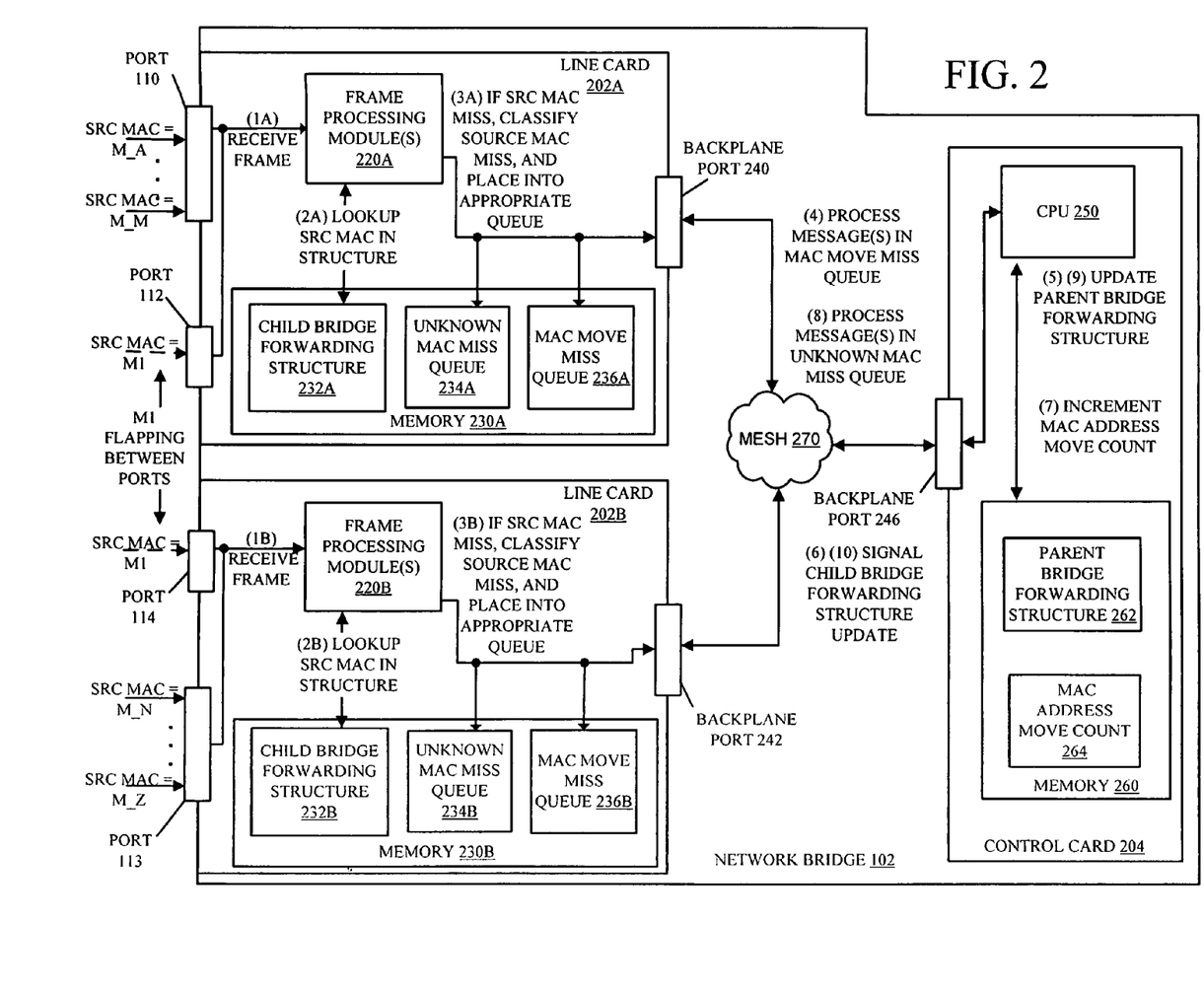
FIG. 2 is a data flow diagram illustrating an exemplary network bridge prioritizing processing source MAC miss messages depending on the type of source MAC miss according to one embodiment of the invention.

FIG. 2 is a data flow diagram illustrating the network bridge 102 prioritizing processing source MAC miss messages depending on the type of source MAC miss according to one embodiment of the invention. The architecture of the network bridge 102 illustrated in FIG. 2 is an example of an architecture of a network bridge, and other, alternative architectures may be used with the embodiments of the invention described herein. For example, other network bridges incorporating embodiments of the invention could have a single card incorporating the functionality of both control card(s) and line card(s). The network bridge 102 includes a control card 204 coupled with the line cards 202A-B through the mesh 270. The control card 204 includes a central processing unit (CPU) coupled with a memory 260. The memory 260 may take a variety of forms for differing embodiments of the invention including non-volatile memory (e.g., hard disk, optical disk, flash, phase change memory (PCM), etc.) and volatile memory (e.g., DRAM, SRAM, etc.). The memory 260 stores a parent bridge forwarding structure 262 and a MAC address move count 264. The control card 204 s connected with the mesh 270 via a backplane port 246.

The line card 202A includes the ports 110 and 112. The line card 202B includes the ports 113 and 114. The line cards 202A-B include the frame processing module(s) 220A-B coupled with the memories 230A-B respectively. The frame processing module(s) 220-B each can take a variety of forms in different embodiments of the invention, including Application Specific Integrated Circuits (ASICs), Field-Programmable Gate Arrays (FPGAs), general purpose microprocessors (e.g., CPUs), etc.). The memories 230A-B may take a variety of forms for differing embodiments of the invention including non-volatile memory (e.g., hard disk, optical disk, flash, PCM etc.) and volatile memory (e.g., DRAM, SRAM, etc.). The frame processing modules(s) 220A-B are connected with the mesh 270 via the backplane ports 240 and 242 respectively. The memories 230A-B store the child bridge forwarding structure 232A-B, the unknown MAC miss queue 234A-B, and the MAC move miss queue 236A-B respectively.

FIG. 2 includes the bridge forwarding loop illustrated in FIG. 1. Thus, the source MAC address M1 is flapping (moving quickly between) the ports 112 and 114. Thus, many source MAC address miss messages are being produced by the bridge forwarding loop. In addition, FIG. 2 illustrates frames having a source MAC address of M_A-M_M being received at the port 110, and frames having a source MAC address of M_N-M_Z being received at the port 113. According to one embodiment of the invention, some of the set of source MAC addresses M_A-M_Z are unknown to the network bridge 102 (i.e., there is no association between those MAC addresses and any of the ports of the network bridge 102) while others of the set of MAC addresses M_A-M_Z are known to the network bridge 102 at a given time.

Figure 5:
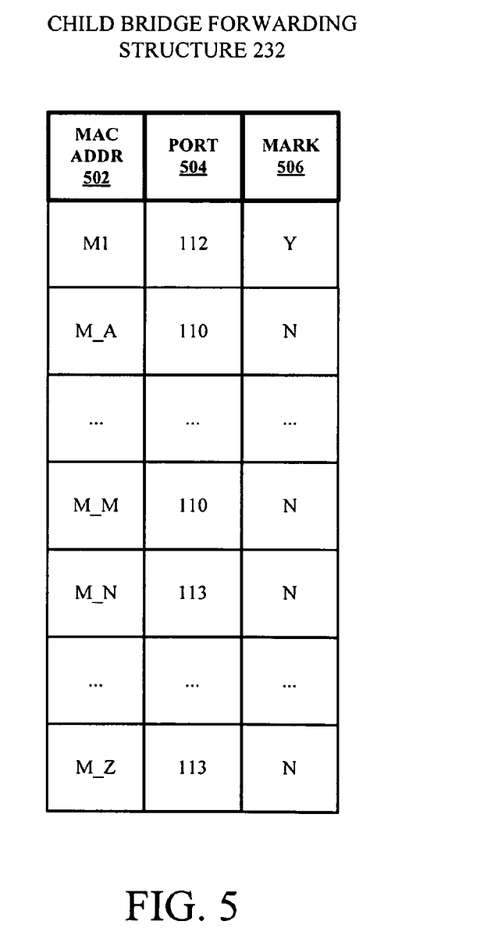
FIG. 5 is an exemplary child bridge forwarding structure according to one embodiment of the invention.

At operations 1A and 1B, a frame is received at each of the line cards 202A-B having a source MAC address of $M_1$ or M_A-M_Z. The line card 202A may receive the frame at the port 110 or 112, and the line card 202B may receive the frame at the port 113 or 114. At operations 2A and 2B, the frame processing module(s) 220A-B perform a source MAC address lookup in the child bridge forwarding structures 232A-B respectively to determine if the source MAC address is associated with the port the frame was received on. FIG. 5 is an exemplary child bridge forwarding structure 232A according to one embodiment of the invention. The child bridge forwarding structure 232A illustrated in FIG. 5 includes a MAC address field 502, a port field 504, and a mark field 506. According to one embodiment of the invention, a MAC address in the MAC address field 502 and a port in the port field 504, form a MAC address/port association.

If there is a source MAC address miss (i.e. the source MAC address of the frame is not associated with the port the frame was received on), the frame processing module(s) 220A-B classify the source MAC address miss and place a source MAC address miss message in either the low priority unknown MAC miss queues 234A-234B or the high priority MAC move miss queues 236A-236B depending on the classification. For example, if the lookup determines that the source MAC address of the frame was associated with a different port than the frame was received on (the MAC address has moved), then in one embodiment of the invention the frame processing module(s) place a source MAC miss message for that MAC address into the high priority MAC move miss queue. It should be understood that the port the source MAC address has moved from may be on the same line card or a different line card. On the other hand, if the lookup determines that the source MAC address of the frame is not associated with any ports of the network bridge (the MAC address is unknown), then in one embodiment of the invention the frame processing module(s) place a source MAC miss message for that MAC address into the low priority unknown MAC miss queue. It should be understood that each of the queues may already include source MAC address miss messages from previous source MAC address misses. In some embodiments of the invention, additional processing is performed prior to determining which queue to place the source MAC address message, which is described in greater detail with reference to FIG. 3.

At operation 4, the CPU 250 processes message(s) in the MAC move miss queues 236A-B. It should be understood that the source MAC miss message placed into either the unknown MAC miss queues 234A-B or the MAC move miss queues 236A-B at operations 3A-3B is not necessarily the trigger for the CPU 250 to begin processing source MAC miss messages. For example, source MAC miss messages may be stored in the MAC move miss queues 236A-236B and/or the unknown MAC miss queue 234A-234B prior to operations 3A-3B. According to one embodiment of the invention, the CPU 250 processes the messages in the MAC move miss queues 236A-B in a FIFO like manner. As part of the processing, the CPU 250 updates the parent bridge forwarding structure 262 at operation 5. The update may include modifying the association between the MAC address and the port to reflect the source MAC address move. At operation 6, the CPU 250 signals the line cards 202A-202B to update their child bridge forwarding structures 232A-232B respectively with the updated association information. At operation 7, the CPU increments a MAC address move count for the MAC address. After the bridge forwarding structure updates have been downloaded to the line cards, and after the MAC address move count has been incremented, processing of that MAC move miss message is completed. According to one embodiment of the invention, each remaining source MAC address miss message in either of the MAC move miss queues 236A-236B is processed in a similar fashion as operations 4-7. Additionally, in some embodiments of the invention, the CPU 250 processes each message from a single MAC move miss queue prior to processing messages from a different MAC move miss queue; however, in alternative embodiments of the invention the CPU 250 processes messages from multiple MAC move miss queues in a round-robin fashion.

According to one embodiment of the invention, after each message in the MAC move miss queues 236A-236B has been processed, the CPU 250 processes the source MAC address miss message(s) in the unknown MAC miss queues 234A-234B at operation 8. As part of the processing, the CPU 250 updates the parent bridge forwarding structure 262 to reflect the new port/MAC address association at operation 9. At operation 10, the CPU 250 signals the line cards 202A-202B to update their child bridge forwarding structures 232A-232B respectively to reflect the new port/MAC address association.

Thus, according to one embodiment of the invention, the source MAC address miss messages in the MAC move miss queues 236A-236B are processed with a higher priority than those source MAC address miss messages in the unknown MAC miss queues 234A-234B. Since a bridge forwarding loop is causing the source MAC address M1 to rapidly move between the ports 112 and 114 (FIG. 1 illustrates the bridge forwarding loop) many source MAC address miss messages will likely be generated and placed in the MAC move miss queues 236A-236B. Since, as previously described, a bridge forwarding loop causes an unnecessary use of network resources (e.g., bandwidth, processing cycles, memory, etc.), and traffic may become blackholed (silently dropped or discarded), the messages in the MAC move miss queues 236A-236B (which may have been generated because of a bridge forwarding loop) are processed with a higher priority than those messages in the unknown MAC miss queues 234A-234B in an attempt to detect and/or resolve a bridge forwarding loop. In other words, since the source MAC address misses in the MAC move miss queues 236A-236B may cause a network disruption that may affect each device in the network (e.g., if there is a bridge forwarding loop), those messages are processed with a high priority in order to take correction action if needed. Thus, prioritizing processing of source MAC miss messages based on the cause of the source MAC address miss allows applications which depend on a MAC address move count over a given time interval (e.g., MAC move detection algorithm) to start sooner, detect a bridge forwarding loop faster, and perform corrective actions more quickly, than if each source MAC address miss message (i.e., those caused by a source MAC address move and those caused by an unknown source MAC address) is processed with the same priority.

Figure 3:
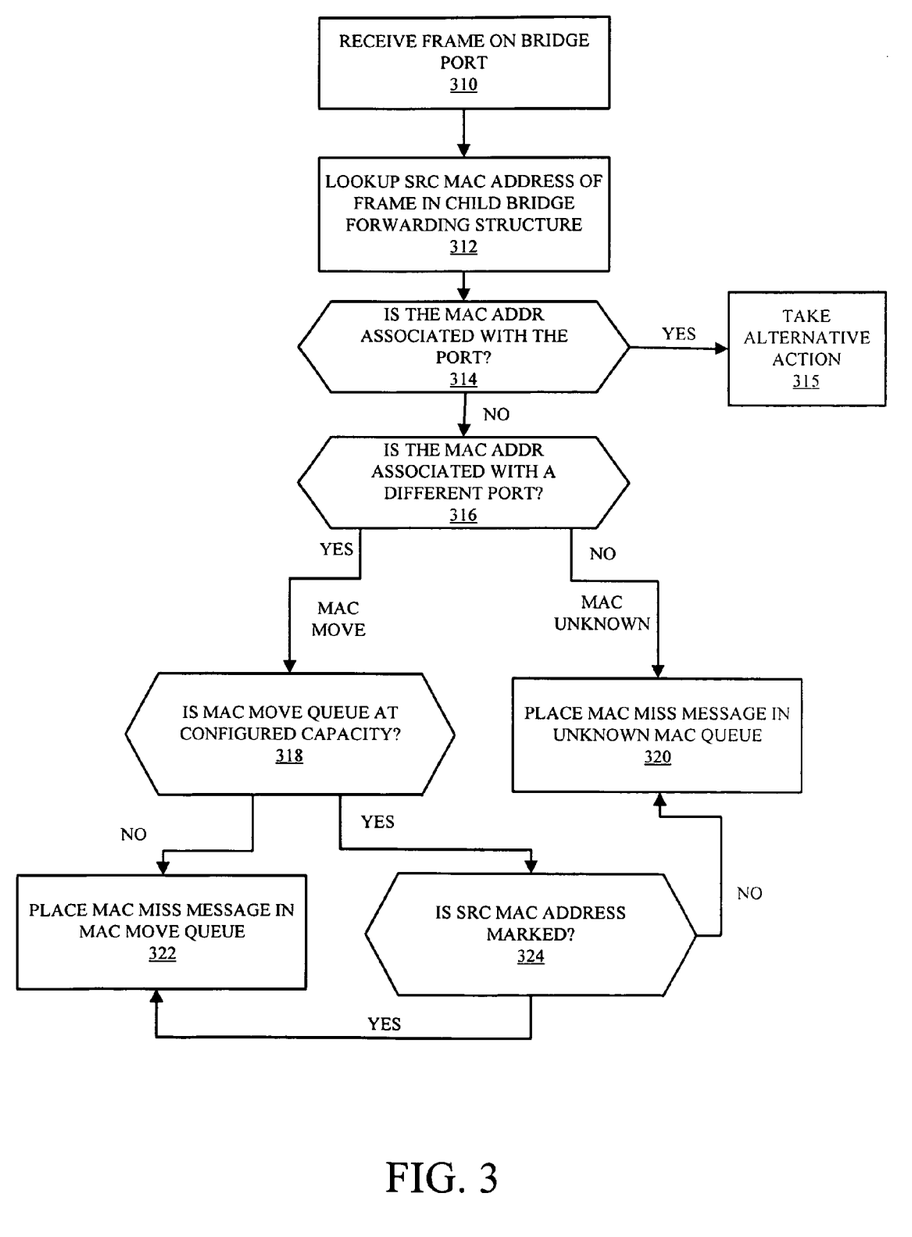
FIG. 3 is a flow diagram illustrating classifying source MAC miss messages depending on the type of source MAC miss according to one embodiment of the invention.

FIG. 3 is a flow diagram illustrating classifying source MAC miss messages depending on the type of source MAC miss according to one embodiment of the invention. At block 310, a frame is received on a bridge port of a network element, which includes a source and destination MAC address. According to one embodiment of the invention, the frame is received at a line card of the network element. Flow moves from block 310 to block 312. At block 312, in addition to any regular processing the line card that received the frame may perform (e.g., parsing the frame), that line card performs a lookup of the frame in a child bridge forwarding structure (which may be stored in local memory on the line card and/or in shared memory). According to one embodiment of the invention, one or more frame processing modules perform the lookup in the child bridge forwarding structure. A destination MAC address lookup is performed to determine how to forward the frame (e.g., towards a particular port of the network element if the destination MAC is known, or to all ports, except the port it was received on, if the destination MAC is unknown). In addition, a source MAC address lookup is performed to determine if there is a source MAC address/port association. Flow moves from block 312 to block 314.

At block 314, a determination is made whether the source MAC address of the frame is associated with the port the frame was received on. For example, in one embodiment of the invention, the frame processing module(s) determine, from the lookup performed in block 312, whether the source MAC address of the frame is associated with the port the frame was received on. If the source MAC address is associated with the port the frame was received on, then flow moves to block 315 where alternative action is taken (e.g., the frame is processed in the typical fashion). However, if the source MAC address is not associated with the port the frame was received on (i.e., there is a source MAC address miss), then flow moves to block 316.

At block 316, a determination is made whether the source MAC address is associated with a different port in the network element. For example, in one embodiment of the invention, frame processing module(s) determine, from the lookup performed in block 312, whether the source MAC address of the frame is associated with a different port in the network element than the port the frame was received on. In other words, at block 316, the cause of the source MAC address miss is determined. If the source MAC address is associated with a different port (i.e., the source MAC address has moved), then flow moves to block 318. However, if the source MAC address is not associated with a different port (i.e., the source MAC address is not associated with any ports in the network element (the source MAC address is unknown)), then flow moves to block 320.

At block 320, a source MAC address miss message is placed in a low priority unknown MAC queue for the source MAC address of the received frame. While in one embodiment of the invention the low priority unknown MAC queue is stored in local memory of the line card and managed by one or more processors in the line card, in alternative embodiments of the invention the low priority unknown MAC queue is stored in shared memory and managed by an operating system kernel of the network element. According to one embodiment of the invention, the source MAC address miss messages in the low priority unknown MAC queue are processed in a FIFO manner.

At block 318, a determination is made whether a high priority MAC move queue is at a configured capacity. For example, in a case where there are many source MAC addresses moving (e.g., in a bridge forwarding loop), it is possible that the high priority MAC move queue will exhaust its allocated storage space while the low priority unknown MAC queue may have space for additional source MAC address miss messages. Thus, if the high priority MAC move queue is at a configured capacity, according to one embodiment of the invention subsequent source MAC address miss messages caused by a source MAC move may be added to the low priority unknown MAC queue. According to one embodiment of the invention, these messages are added to the top of the low priority unknown MAC queue. Additionally, according to some embodiments of the invention, if the low priority unknown MAC queue is full, then these messages are added to the top of the low priority unknown MAC queue, and messages from the bottom of the low priority unknown MAC queue are removed. It should be understood that the configured capacity need not be all of the allocated storage space of the high priority MAC move queue. For example, a configured capacity may be a percentage of total allocated storage space of the high priority MAC move queue (e.g., 50% or some other percentage). If the high priority MAC move queue is at the configured capacity, then flow moves to block 324. However, if the high priority MAC move queue is not at the configured capacity, then flow moves to block 322.

At block 322, a source MAC address miss message is placed in the high priority MAC move queue for the source MAC address of the received frame. For example, according to one embodiment of the invention, one or more processing modules places the source MAC address miss message in the high priority MAC move queue. While in one embodiment of the invention the high priority MAC move queue is stored in local memory of the line card and managed by one or more processors in the line card, in alternative embodiments of the invention the high priority MAC move queue is stored in shared memory and managed by an operating system kernel of the network element. According to one embodiment of the invention, the source MAC address miss messages in the high priority MAC move queue are processed in a FIFO manner.

At block 324, a determination is made to determine whether the source MAC address is marked as being previously moved. For example, each source MAC address message caused by a source MAC move is marked (e.g., in some embodiments of the invention the marking is performed by a CPU in a control card). For example, referring to FIG. 5, the MAC address M1 is marked as being previously moved. If the source MAC address has previously moved (and is thus marked), then there is a greater possibility that the source MAC address is moving due to a bridge forwarding loop. In addition, in some embodiments of the invention, the mark is cleared after a predetermined amount of time has expired. For example, a control card in the network element may mark a source MAC address and indicate an expiration time (e.g., 5 seconds). The frame processing modules disregard a mark that is not valid (i.e., an expired mark). If the source MAC address is not marked, or is invalid, then flow moves to block 320 where a source MAC address miss message is placed into the unknown MAC queue for the source MAC address of the received frame. However, if the source MAC address is marked, then flow moves to block 322 where a source MAC address miss message is placed in the high priority MAC move queue for the source MAC address of the received frame.

Figure 4:
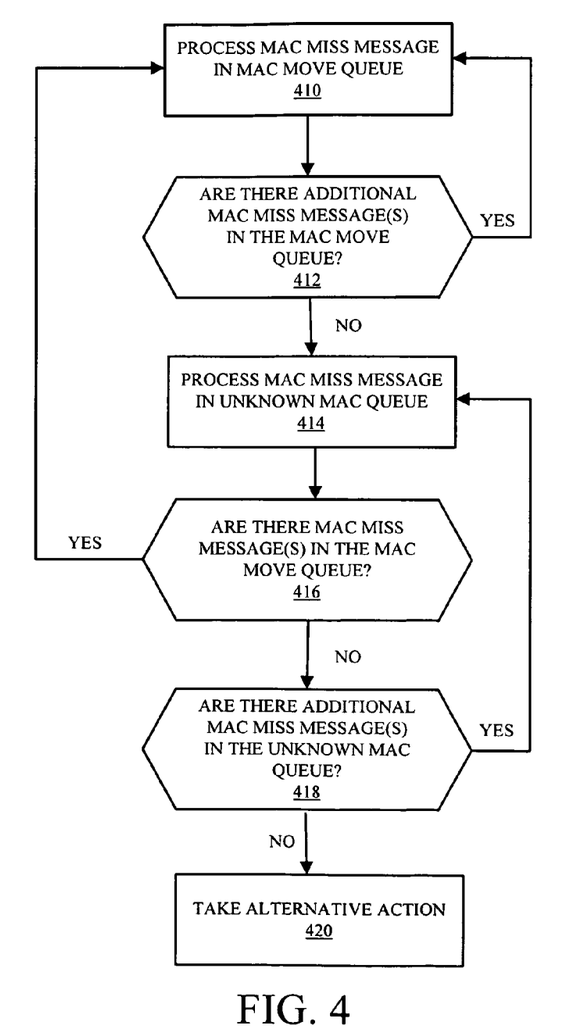
FIG. 4 is a flow diagram illustrating processing source MAC miss messages depending on their priority according to one embodiment of the invention.

FIG. 4 is a flow diagram illustrating processing source MAC miss messages depending on their priority according to one embodiment of the invention. In some embodiments of the invention, a CPU on a control card of the network element processes the source MAC miss messages and performs the operations illustrated in FIG. 4. According to one embodiment of the invention, source MAC miss messages are processed serially (e.g., they are processed one at a time).

At block 410, a source MAC miss message in a high priority MAC move queue is processed. For example, the top source MAC miss message in the queue is processed (e.g., the source MAC miss message remaining in the queue that was placed on the queue first). According to some embodiments of the invention, the processing includes updating a parent bridge forwarding structure to reflect the modified MAC address/port association, incrementing a MAC address move count for the MAC address, determining whether to execute a MAC move detection application, and signaling the update of the child bridge forwarding structure(s). Flow moves from block 410 to block 412.

At block 412, a determination is made whether there are additional source MAC miss message(s) in the high priority MAC move queue. If the high priority MAC move queue is empty, then flow moves to block 414. However, if the high priority MAC move queue includes at least one other source MAC miss message, then flow moves to block 410 where that message is processed. In other words, according to some embodiments of the invention, each source MAC miss message in the high priority MAC move queue is processed prior to processing a source MAC miss message in a low priority unknown MAC queue.

At block 414, a source MAC miss message in a low priority unknown MAC queue is processed. For example, the top source MAC miss message in the queue is processed (e.g., the source MAC miss message remaining in the queue that was placed on the queue first). According to some embodiments of the invention, the processing includes updating a parent bridge forwarding structure to reflect the current MAC address/port association, determining whether to execute a MAC move detection application, and signaling the update of the child bridge forwarding structure(s). In addition, in some embodiments of the invention, a source MAC miss message in the low priority unknown MAC queue may be caused by a source address MAC move (e.g., if the high priority MAC move queue has reached its configured capacity). Thus, the processing of these messages may be different (e.g., a MAC address move count for the MAC address may be incremented, etc.). Flow moves from block 414 to block 416.

At block 416, a determination is made whether there are additional source MAC address miss message(s) in the high priority MAC move queue. For example, during the time in which a source MAC miss message in the low priority unknown MAC queue is processed, one or more source MAC miss messages may be generated and placed in the high priority MAC move queue. If there is at least one source MAC miss message in the high priority MAC move queue, then flow moves back to block 410, where that source MAC miss message is processed. However, if there is no source MAC miss message(s) in the high priority MAC move queue, then flow moves to block 418.

At block 418, a determination is made whether there are additional source MAC miss message(s) in the low priority unknown MAC queue. If there is at least one source MAC miss message remaining in the low priority unknown MAC queue, then flow moves back to block 414. However, if no source MAC miss messages remain in the low priority unknown MAC queue, then flow moves to block 420 where alternative action is taken (e.g., the CPU waits for additional source MAC address miss messages to process).

Thus, according to one embodiment of the invention, the source MAC address miss messages in the high priority MAC move miss queue(s) are processed with a higher priority than those source MAC address miss messages in the unknown MAC miss queue(s). Prioritizing processing of source MAC miss messages based on the cause of the source MAC address miss allows applications which depend on a MAC address move count over a given time interval (e.g., MAC move detection algorithm) to start sooner, detect a bridge forwarding loop faster, and perform corrective actions more quickly, than if each source MAC address miss message (i.e., those caused by a source MAC address move and those caused by an unknown source MAC address) was processed with the same priority.

According to some embodiments of the invention, the network bridge 102 is a virtual network bridge within a network element. For example, the network bridge 102 is a virtual network bridge of a bridge context, and may belong to a particular service provider (e.g., Internet Service Provider (ISP) A). The network bridge 104 may also be part of the bridge context, and may belong to the same service provider or a different service provider (e.g., ISP B). Each frame received may be assigned to a circuit, and the circuit may be bound to a particular virtual network bridge. A circuit can take a variety of forms in different embodiments of the invention, including PPPoE session, ATM permanent virtual circuit (PVC), 802.1Q (VLAN) PVC, etc. In addition, in some embodiments of the invention, a source MAC address move includes a source MAC address moving between circuits and/or virtual network bridges.

While the data and flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for prioritizing source Media Access Control (MAC) address miss processing in a network element, comprising:
  receiving a plurality of frames at a plurality of ports of the network element, each frame including a source MAC address;
  for each one of the plurality of frames, determining whether the source MAC address of that frame is associated with the port that frame was received on, wherein at least a set of two or more of the plurality of frames are determined to each include a source MAC address that is not associated with the port its frame was received on respectively;
  for each of the set of two or more of the plurality of frames determining whether the source MAC address of that frame is associated with a different one of the plurality of ports of the network element than the port in which that frame was received;
  for each of those of the set of two or more of the plurality of frames whose source MAC address is associated with a different one of the plurality of ports of the network element than the port in which that frame was received, placing a source MAC miss message in a high priority MAC move miss queue;
  for each of those of the set of two or more of the plurality of frames whose source MAC address is not associated with any of the plurality of ports of the network element, placing a source MAC miss message in a low priority unknown MAC miss queue; and
  internally processing those source MAC miss messages in the high priority MAC move miss queue with a higher priority than processing those source MAC miss messages in the low priority unknown MAC miss queue, wherein processing each source MAC miss message includes updating one or more forwarding structures of the network element to reflect an association between the port the corresponding frame was received on and the source MAC address.

2. The method of claim 1, wherein the plurality of ports are distributed among a plurality of line cards and the processing of the source MAC miss messages is performed in a control card coupled with the plurality of line cards, and wherein the higher priority processing includes processing those source MAC miss messages in the high priority MAC move miss queue prior to processing those source MAC miss messages in the low priority unknown MAC miss queue.

3. The method of claim 2, wherein the step of determining whether the source MAC address of each one of the plurality of frames is associated with the port that frame was received on further includes performing a lookup in a child bridge forwarding structure of the line card of the port the frame was received at.

4. The method of claim 1, wherein the step of processing of those source MAC miss messages further includes counting those source MAC miss messages in the MAC move miss queue to obtain a MAC move count, and executing a source MAC address move detection application if the MAC move count exceeds a threshold for a given time interval.

5. The method of claim 1, wherein the step of updating the one or more forwarding structures includes modifying or creating an entry in a parent bridge forwarding structure in the control card and updating a child bridge forwarding structure in each of the plurality of line cards with the association.

6. The method of claim 1, further comprising for each of the set of two or more of the plurality of frames whose source MAC address is associated with the port that frame was received on, performing the following,
   upon determining that a destination MAC address included in the frame is associated with one of the plurality of ports, and is not local to the network element, forwarding the frame out of the associated port, and
   upon determining that the destination MAC address included in the frame is not associated with any of the plurality of ports, forwarding the frame out of each of the plurality of ports except for the port the frame was received on.

7. The method of claim 1, further comprising if the number of source MAC address miss messages in the MAC move miss queue is at a predefined capacity, placing subsequent source MAC address miss messages caused by a MAC move miss into the unknown MAC miss queue until the number of source MAC address miss messages in the MAC move miss queue is less than the predefined capacity.

8. A network element to prioritize source Media Access Control (MAC) address miss processing, comprising:
   a plurality of line cards each to include,
      one or more ports to receive frames,
      one or more frame processing modules coupled with the one or more ports, the frame processing modules to determine source MAC address misses and classify each one of those determined source MAC address misses based on a type of source MAC miss including source MAC address move and unknown source MAC address; and
   a control card coupled with the plurality of line cards, the control card including,
      a processor to process the source MAC address misses, wherein the processor is to process the source MAC address misses classified as source MAC address moves prior to processing the source MAC address misses classified as unknown source MAC addresses.

9. The network element of claim 8, wherein the plurality of line cards each are further to include a memory coupled with the frame processing modules, the memory to store a MAC move miss queue and an unknown MAC miss queue, and wherein the one or more frame processing modules further are to create source MAC address miss messages and place those source MAC address miss messages into either the MAC move miss queue or the unknown MAC miss queue depending on the classification.

10. The network element of claim 9, wherein the processor is to process each of the MAC address miss messages in the MAC move miss queue prior to processing the MAC address miss messages in the unknown MAC miss queue.

11. The network element of claim 9, wherein the memory in each of the plurality of line cards is further to store a child bridge forwarding structure to store associations between MAC addresses and ports.

12. The network element of claim 11, wherein the control card is to further include a memory to store a parent bridge forwarding structure to store associations between MAC addresses and ports, and wherein the processor is to distribute content of the parent bridge forwarding structure to each of the child bridge forwarding structures.

13. The network element of claim 12, wherein the processor is to, for each source MAC address miss, create an association between the source MAC address and the port it was received on in the parent bridge forwarding structure.

14. The network element of claim 11, wherein the one or more frame processing modules are to perform a lookup in the child bridge forwarding structure for a source MAC address in the frame to determine whether that source MAC address is a source MAC address miss.

15. The network element of claim 8, wherein the processor is further to increment a source MAC address move count for each source MAC address miss message in the MAC move miss queue to obtain a MAC move count, and is to execute a source MAC address move detection application if the MAC move count exceeds a threshold for a given time interval.

16. A non-transitory machine-readable storage medium that provides instructions that, if executed by a processor, will cause said processor to perform operations for prioritizing source Media Access Control (MAC) address miss processing in a network element, comprising:
   receiving a plurality of frames at a plurality of ports of the network element, each frame including a source MAC address;
   for each one of the plurality of frames, determining whether the source MAC address of that frame is associated with the port that frame was received on, wherein at least a set of two or more of the plurality of frames are determined to each include a source MAC address that is not associated with the port its frame was received on respectively;
   for each of the set of two or more of the plurality of frames, determining whether the source MAC address of that frame is associated with a different one of the plurality of ports of the network element than the port in which that frame was received;
   for each of those of the set of two or more of the plurality of frames whose source MAC address is associated with a different one of the plurality of ports of the network element than the port in which that frame was received, placing a source MAC miss message in a high priority MAC move miss queue;
   for each of those of the set of two or more of the plurality of frames whose source MAC address is not associated with any of the plurality of ports of the network element, placing a source MAC miss message in a low priority unknown MAC miss queue; and
   internally processing those source MAC miss messages in the high priority MAC move miss queue with a higher priority than processing those source MAC miss messages in the low priority unknown MAC miss queue, wherein processing each source MAC miss message includes updating one or more forwarding structures of the network element to reflect an association between the port the corresponding frame was received on and the source MAC address.

17. The non-transitory machine-readable storage medium of claim 16, wherein the plurality of ports are distributed among a plurality of line cards and the processing of the source MAC miss messages is performed in a control card coupled with the plurality of line cards, and wherein the higher priority processing includes processing those source MAC miss messages in the high priority MAC move miss queue prior to processing those source MAC miss messages in the low priority unknown MAC miss queue.

18. The non-transitory machine-readable storage medium of claim 17, wherein the step of determining whether the source MAC address of each one of the plurality of frames is associated with the port that frame was received on further includes performing a lookup in a child bridge forwarding structure of the line card of the port the frame was received at.

19. The non-transitory machine-readable storage medium of claim 16, wherein the step of processing of those source MAC miss messages further includes counting those source MAC miss messages in the MAC move miss queue to obtain a MAC move count, and executing a source MAC address move detection application if the MAC move count exceeds a threshold for a given time interval.

20. The non-transitory machine-readable storage medium of claim 16, wherein the step of updating the one or more forwarding structures includes modifying or creating an entry in a parent bridge forwarding structure in the control card and updating a child bridge forwarding structure in each of the plurality of line cards with the association.

21. The non-transitory machine-readable storage medium of claim 16, further comprising for each of the set of two or more of the plurality of frames whose source MAC address is associated with the port that frame was received on, performing the following,
 upon determining that a destination MAC address included in the frame is associated with one of the plurality of ports, and is not local to the network element, forwarding the frame out of the associated port, and
 upon determining that the destination MAC address included in the frame is not associated with any of the plurality of ports, forwarding the frame out of each of the plurality of ports except for the port the frame was received on.

22. The non-transitory machine-readable storage medium of claim 16, further comprising if the number of source MAC address miss messages in the MAC move miss queue is at a predefined capacity, placing subsequent source MAC address miss messages caused by a MAC move miss into the unknown MAC miss queue until the number of source MAC address miss messages in the MAC move miss queue is less than the predefined capacity.

\* \* \* \* \*